(12) United States Patent
Pachidis et al.

(10) Patent No.: US 11,852,099 B1
(45) Date of Patent: Dec. 26, 2023

(54) GAS TURBINE ENGINE

(71) Applicant: ROLLS-ROYCE plc, London (GB)

(72) Inventors: Vasileios Pachidis, Milton Keynes (GB); David J Rajendran, Bedford (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 18/199,245

(22) Filed: May 18, 2023

(30) Foreign Application Priority Data

May 20, 2022 (GR) .............................. 20220100425

(51) Int. Cl.
*F02K 1/70* (2006.01)
*F02K 3/06* (2006.01)
*F02K 3/075* (2006.01)

(52) U.S. Cl.
CPC .................. *F02K 1/70* (2013.01); *F02K 3/06* (2013.01); *F02K 3/075* (2013.01); *F05D 2240/14* (2013.01); *F05D 2260/606* (2013.01)

(58) Field of Classification Search
CPC ..... F02K 1/70; F02K 1/66; F02K 1/54; F02K 3/06; F02K 3/075; F02C 7/042; F02C 9/18
See application file for complete search history.

(56) References Cited

U.S. PATENT DOCUMENTS

| 3,476,486 A | 11/1969 | Chilman et al. | |
| 3,747,341 A * | 7/1973 | Davis | F02K 3/06 |
| | | | 239/265.31 |
| 4,030,290 A * | 6/1977 | Stachowiak | F02K 1/64 |
| | | | 239/265.33 |
| 5,076,052 A * | 12/1991 | Wildner | F02K 3/075 |
| | | | 60/767 |
| 5,315,821 A | 5/1994 | Dunbar et al. | |
| 10,753,278 B2 | 8/2020 | Nestico et al. | |
| 11,255,295 B2 | 2/2022 | Pouyau et al. | |

(Continued)

FOREIGN PATENT DOCUMENTS

| EP | 3 845 754 A1 | 7/2021 |
| GB | 2 070 691 A | 9/1981 |

(Continued)

OTHER PUBLICATIONS

Jan. 9, 2023 Search Report issued in British Patent Application No. 2210040.8.

(Continued)

*Primary Examiner* — Andrew H Nguyen
(74) *Attorney, Agent, or Firm* — Oliff PLC

(57) ABSTRACT

A gas turbine engine includes a core engine casing, a bypass duct and a core engine duct. The gas turbine engine further includes a plurality of flaps pivotally coupled to the core engine casing and arranged circumferentially around a principal rotational axis. Each flap extends from a first casing end and is configured to pivotally rotate relative to core engine casing about a pivot axis between a first position and a second position. In the first position, each flap is disposed in a circumferential direction and is radially disposed between a plurality of outlet guide vanes and a plurality of stator vanes. In the second position, each flap is inclined to the first position and extends at least partially into the bypass duct and the core engine duct.

14 Claims, 5 Drawing Sheets

(56) References Cited

U.S. PATENT DOCUMENTS

| | | | |
|---|---|---|---|
| 2013/0025260 A1* | 1/2013 | Pitiot | F02K 1/70 |
| | | | 60/226.2 |
| 2013/0067885 A1* | 3/2013 | Suciu | F02K 1/1207 |
| | | | 60/226.2 |
| 2017/0226960 A1 | 8/2017 | Nakano et al. | |
| 2017/0284297 A1* | 10/2017 | Nestico | F02K 3/075 |
| 2018/0135557 A1* | 5/2018 | Pouyau | B64D 33/02 |

FOREIGN PATENT DOCUMENTS

| | | |
|---|---|---|
| WO | 2021/038169 A1 | 3/2021 |
| WO | 2022/263203 A1 | 12/2022 |

OTHER PUBLICATIONS

Jan. 3, 2023 Combined Search and Examination Report issued in British Patent Application No. 2210039.0.

U.S. Appl. No. 18/199,260, filed May 18, 2023 in the name of Pachidis et al.

Sep. 1, 26, 2023 Extended European Search Report issued in European Patent Application No. 23169566.9.

Oct. 19, 2023 European Search Report Issued in European Patent Application No. 23169565.1.

\* cited by examiner

GAS TURBINE ENGINE

CROSS-REFERENCE TO RELATED APPLICATIONS

This specification is based upon and claims the benefit of priority from Greek patent application number GR 20220100425 filed on May 20, 2022, the entire contents of which is incorporated herein by reference.

The present application is co-filed with a United States patent application that is based upon and claims the benefit of priority from Greek patent application GR 20220100424 filed on May 20, 2022.

BACKGROUND

Field of the Disclosure

The present disclosure generally relates to a gas turbine engine.

Description of the Related Art

Many known gas turbine engines (e.g., aircraft engines) have a ducted fan and a core engine arranged in flow communication with one another. The fan provides air to the core engine (a "core flow") and to a bypass duct surrounding the core engine (a "bypass flow"). Gas turbine engines typically also include an annular splitter at which the flow is divided between the core flow and the bypass flow.

Fans generally include a fan disk attached to the core engine and multiple fan blades mounted to the fan disk for rotation with the fan disk. Some known fans have blades for which a pitch may be varied to optimize a performance of the fan. Such fans may be configured such that the blades, at one pitch angle, generate a forward flow (resulting in a forward thrust), and, at another pitch angle, generate a reverse flow (resulting in a reverse thrust). The forward flow may be directed towards an aft end of the gas turbine engine. The reverse flow may be directed towards a front end of the gas turbine engine. The reverse thrust may be useful in certain situations, e.g., during landing of an aircraft.

During the revere thrust, air is forced around the gas turbine engine through the bypass duct before it is drawn into the core engine. A portion of the reverse flow may follow a sharp turn at the annular splitter to enter an entry duct of the core engine. Upon entering the entry duct of the core engine, air flows in a normal direction, i.e., from forward to aftward. In gas turbine engines with outlet guide vanes (OGVs) disposed in the bypass duct, the reverse flow is deflected by the OGVs at an OGV inlet angle as the reverse flow exits the OGVs. This flow (moving towards the OGV inlet angle) may then be incident on an engine section stator (ESS) blade row disposed in the entry duct of the core engine after turning sharply at the annular splitter.

In the reverse thrust operation, the difference between a nominal inlet angle of the ESS blades and the OGV inlet angle may result in a large adverse negative incidence on the ESS blades causing substantial flow separation at an aerofoil pressure side of the ESS blades effectively blocking the complete aerofoil passage. This flow separation may be referred to as "aerofoil separation". Aerofoil separation may increase a total pressure loss at the entry duct of the core engine during the reverse thrust operation and may cause the core engine to operate in distorted flow conditions, thereby adversely affecting the operation of the core engine. Consequently, this may deteriorate operability of the core engine, thereby affecting the ability of the core engine to develop a required power to rotate the fan during the revere thrust.

No solutions are currently available that address the "aerofoil separation" problem. Conventional generic aerofoil designs that are developed to make the aerofoils tolerant to large incidence angle variations are not effective in handling the extent of incidence angle variation as observed between the forward flow and the reverse flow. Moreover, these generic aerofoil designs may result in deterioration of nominal cruise performance of the gas turbine engine.

Further, modifying the gas turbine engine architecture to address this core engine operability issue may require unfeasible, uneconomical, and large scale engineering changes (e.g., moving the OGVs forward with respect to the annular splitter). Such design modifications may result in an engine design that is significantly altered and compromised to address the aforementioned problems that are experienced only for a fraction of the engine operation (e.g., during landing). Consequently, the effect of these design changes may inordinately affect a performance of the aircraft during normal operation.

SUMMARY OF THE DISCLOSURE

The present disclosure provides a gas turbine engine as set out in the appended claims.

According to a first aspect, there is provided a gas turbine engine having a principal rotational axis. The gas turbine engine further includes a fan coaxial with the principal rotational axis and a nacelle circumferentially surrounding the fan. The gas turbine engine further includes a core engine disposed downstream of the fan and extending along the principal rotational axis. The gas turbine engine further includes a core engine casing circumferentially surrounding the core engine around the principal rotational axis. The core engine casing extends along the principal rotational axis from a first casing end to a second casing end downstream of the first casing end. The first casing end is proximal to the fan. The core engine casing includes a casing outer surface and a casing inner surface. The gas turbine engine further includes a bypass duct defined between the nacelle and the casing outer surface. The gas turbine engine further includes a core engine duct at least partially defined by the casing inner surface. The gas turbine engine further includes a plurality of outlet guide vanes (OGVs) arranged around the principal rotational axis and coupled to the core engine casing. Each OGV from the plurality of OGVs radially extends outwards from the casing outer surface into the bypass duct. The gas turbine engine further includes a plurality of stator vanes coupled to the core engine casing proximal to the first casing end. Each stator vane from the plurality of stator vanes radially extends inwards from the casing inner surface into the core engine duct. The gas turbine engine further includes a plurality of flaps pivotally coupled to the core engine casing and arranged circumferentially around the principal rotational axis. Each flap from the plurality of flaps extends from the first casing end towards the fan. Each flap is configured to pivotally rotate relative to core engine casing about a pivot axis parallel to the principal rotational axis. Each flap is pivotable between a first position and a second position about the pivot axis. In the first position, each flap is disposed in a circumferential direction around the principal rotational axis and is radially disposed between the plurality of OGVs and the plurality of stator vanes relative to the principal rotational axis. In the second position, each flap is inclined to the first position and extends at least partially into the bypass duct and the core engine duct.

Each flap from the plurality of flaps may move between the first position (operational during forward flow resulting in forward thrust) and the second position (operational during reverse flow resulting in reverse thrust). Thus, during the reverse thrust, the reverse flow of air may be intercepted by the plurality of flaps. The plurality of flaps may then provide circumferential guidance to the reverse flow of air as the flow negotiates a turn at the first casing end (or a splitter edge) towards the core engine duct.

Specifically, during the reverse thrust, the reverse flow of air exiting the plurality of OGVs at an OGV inlet angle may be circumferentially guided by each flap (in the second position) that is coupled to the core engine casing and extends from the first casing end of the core engine casing towards the fan. Thus, the plurality of flaps may at least partially align the reverse flow to mitigate the "aerofoil separation" at the plurality of stator vanes arising due to a difference between a nominal inlet angle of each stator vane and the OGV inlet angle. The circumferential guidance may at least partially align the reverse flow towards the nominal inlet angle of each stator vane, thereby mitigating distorted flow conditions inside the core engine (i.e., "aerofoil separation" at the stator vanes or engine section stator blades). The circumferential guidance may be provided to the reverse flow since each flap pivotally rotates relative to the core engine casing about the pivot axis to guide the reverse flow.

The plurality of flaps may remain in the first position during nominal operation of the gas turbine engine (i.e., during forward flow resulting in forward thrust). Thus, the plurality of flaps may not obstruct the forward flow during nominal operation of the gas turbine engine, thereby providing an aerodynamic continuity and avoiding disruption to the forward flow. Therefore, the implementation of the plurality of flaps may not compromise with the nominal performance of the gas turbine engine. Further, the plurality of flaps may have minimal impact on the overall design of the gas turbine engine with simple implementation to address operability distress of the core engine arising during the reverse flow (i.e., during the reverse thrust conditions).

The plurality of flaps of the present disclosure are of particular advantage when compared with conventional aerofoil related design modifications (e.g., for the stator vanes) capable of handling large variation in incidence angles arising due to the difference between the nominal inlet angle of each stator vane and the OGV inlet angle. This is because such aerofoil design modifications, when utilized to address only the "aerofoil separation" at the plurality of stator vanes, result in persistent higher penalties on the nominal performance of the gas turbine engine. Moreover, none of the traditional aerofoil design modifications may be able to accommodate up to 120 degrees of variation in the incidence angle observed during the reverse thrust as the plurality of flaps of the present disclosure.

In some embodiments, the gas turbine engine further includes an actuation mechanism operatively coupled to each flap. The actuation mechanism is configured to selectively rotate each flap between the first position and the second position.

In some embodiments, the fan is configured to selectively operate in a normal mode and a reverse mode. In the normal mode, the fan is configured to generate an airflow in a first direction from the first casing end to the second casing end. In the reverse mode, the fan is configured to generate an airflow in a second direction opposite to the first direction.

In the reverse mode, the airflow in the second direction inside the gas turbine engine may cause an aircraft (to which the gas turbine engine may be mounted) to decelerate, thereby enabling the aircraft to stop over shorter landing distances and reduce wear on brakes of the aircraft.

In some embodiments, in the normal mode, each flap is in the first position. In the reverse mode, each flap is in the second position, such that the plurality of flaps form a plurality of flow channels therebetween. The plurality of flow channels are configured to guide an airflow from the bypass duct to the core engine duct. Thus, the plurality of flaps may only be operational during the reverse mode while minimising an impact of design modifications on the normal mode of the fan due to implementation of the plurality of flaps on the gas turbine engine. In the reverse mode, the plurality of flow channels formed by the plurality of flaps may be angular radial flow channels that may allow the circumferential guidance of the airflow from the bypass duct (i.e., the reverse flow) to at least partially align the airflow with the nominal inlet angle of the plurality of stator vanes, thereby mitigating the "aerofoil separation" at the stator vanes.

In some embodiments, in the reverse mode, a direction of rotation of each flap about the pivot axis from the first position to the second position is the same as a direction of rotation of the fan about the principal rotational axis.

In some embodiments, each flap, when in the first position, includes a first major surface facing the bypass duct. In some embodiments, each flap further includes a second major surface opposite to the first major surface and facing the core engine duct. Each of the first major surface and the second major surface is curved, such that the plurality of flaps form an annular arrangement around the principal rotational axis in the respective first positions. Thus, the obstruction caused by the plurality of flaps to the forward flow in the normal mode of the fan is minimal since each of the first major surface and the second major surface is curved based on a shape of the first casing end. This may ensure no significant penalty on the nominal performance of the gas turbine engine due to the implementation of the plurality of flaps. Further, the plurality of flow channels may be formed between the first major surface of one flap and the second major surface of an adjacent flap from the plurality of flaps.

In some embodiments, each flap has a constant thickness between the first major surface and the second major surface. Thus, the first major surface and the second major surface may have a substantially similar shape (e.g., arcuate shape). Further, the plurality of flaps may only need to be thick enough to ensure structural integrity. Thus, a power required for the actuation mechanism may be lower. Additionally, since the plurality of flaps are not of considerable thickness, the added weight due to the implementation of the plurality of flaps and the actuation mechanism may be low.

In some embodiments, each flap further includes a first circumferential edge disposed between the first major surface and the second major surface. In some embodiments, each flap further includes a second circumferential edge opposite to the first circumferential edge and disposed between the first major surface and the second major surface. In the first position, the first circumferential edge of each flap is disposed adjacent to the second circumferential edge of an adjacent flap from the plurality of flaps and the second circumferential edge of each flap is disposed adjacent to the first circumferential edge of an opposing adjacent flap from the plurality of flaps. In the second position, the first circumferential edge is disposed in the bypass duct and the second circumferential edge is disposed in the core engine duct. Thus, in the respective second positions, the plurality of flaps may intercept the airflow from the bypass duct (i.e., the reverse flow) since the first circumferential edge is disposed in the bypass duct to guide the airflow circumferentially with respect to the principal rotational axis.

In some embodiments, each flap has an axial length along the principal rotational axis. The axial length of each flap is from 10% to 100% of a chord length of each stator vane.

In some embodiments, an inclination angle between the first position and the second position is from 5 degrees to 85 degrees. The value of inclination angle may determine an extent of the circumferential guidance of the reverse flow in the reverse mode of the fan.

In some embodiments, the gas turbine engine further includes a plurality of pivot rods corresponding to the plurality of flaps. Each pivot rod from the plurality of pivot rods is coupled to the core engine casing and extends from the first casing end towards the fan along the pivot axis. Each flap is pivotally coupled to a corresponding pivot rod from the plurality of pivot rods. Each flap may be coupled to the core engine casing through the corresponding pivot rod. Further, each pivot rod may allow the corresponding flap to rotate with respect to the core engine casing.

In some embodiments, a number of the plurality of flaps is from 3 to 70. The number of flaps may be determined based on the extent of the circumferential guidance required by the airflow from the bypass duct (i.e., the reverse flow) in the reverse mode of the fan.

In some embodiments, the plurality of flaps are disposed equiangularly around the principal rotational axis.

In some embodiments, at least a portion of the core engine casing axially disposed between the plurality of OGVs and the first casing end along the principal rotational axis is continuous and devoid of any passage that fluidly communicates the bypass duct with the core engine duct. Thus, in the reverse mode, the airflow in the bypass duct may enter the core engine duct only after negotiating the turn at the first casing end of the core engine casing. Further, the plurality of flaps extend from the first casing end, and may intercept the airflow and provide the circumferential guidance to the airflow before the airflow turns towards the core engine duct at the first casing end.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
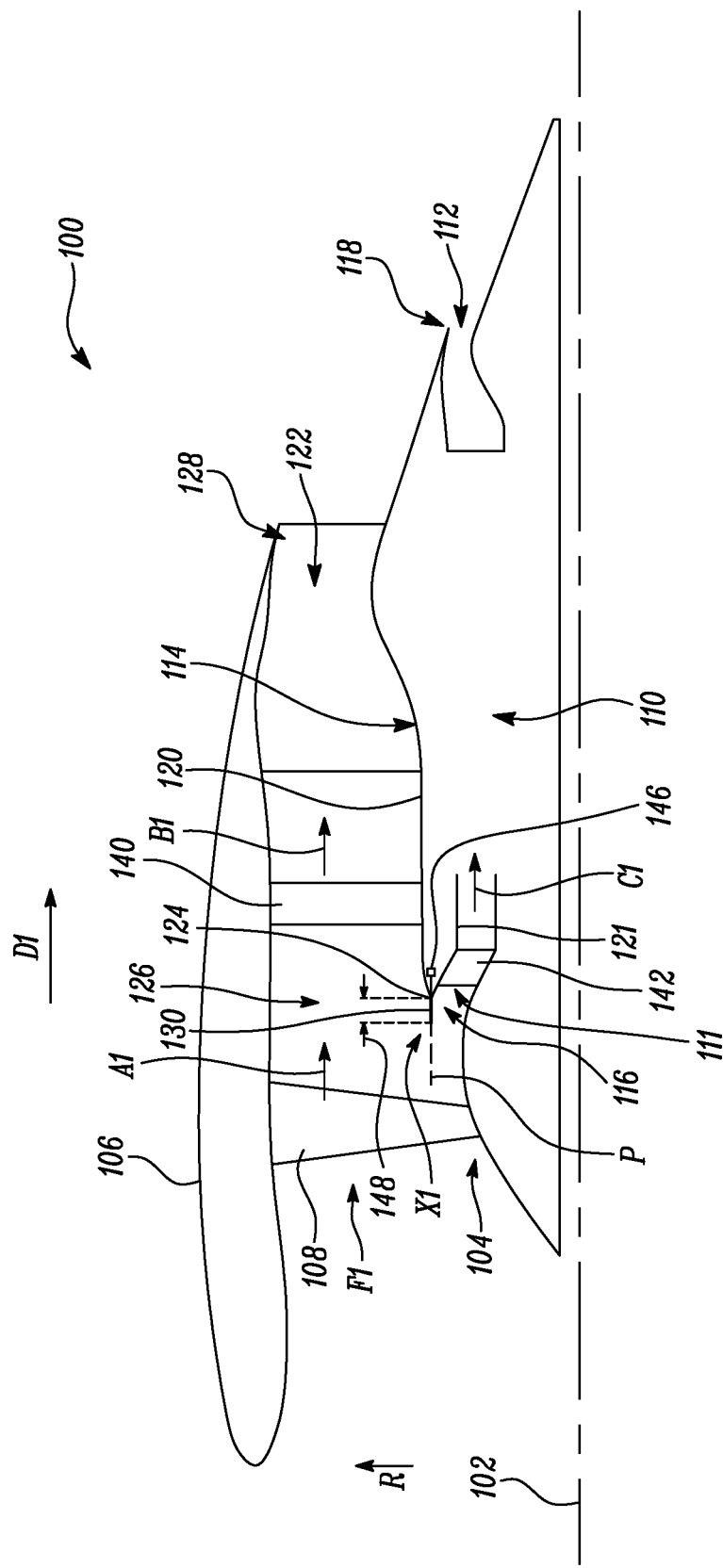
FIG. 1 is a schematic sectional side view of a gas turbine engine in a normal mode of a fan, according to an embodiment of the present disclosure.
Figure 2:
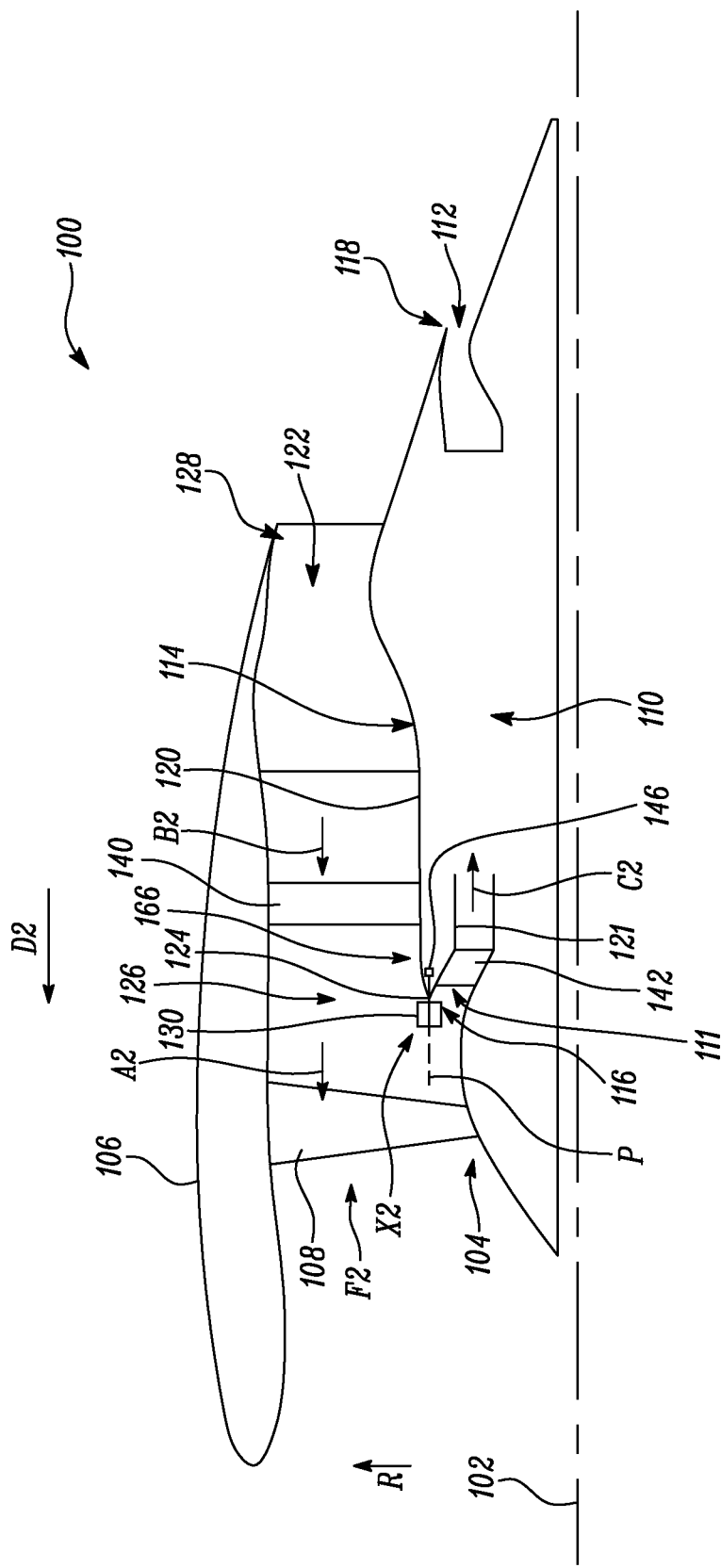
FIG. 2 is a schematic sectional side view of the gas turbine engine in a reverse mode of the fan, according to an embodiment of the present disclosure.

FIGS. 1 and 2 illustrate schematic sectional side views of a gas turbine engine 100. In some embodiments, the gas turbine engine 100 may be used to drive and/or provide power to an aircraft (not shown).

As used herein, the term "aircraft" includes, but is not limited to, helicopters, airplanes, fixed wing vehicles, variable wing vehicles, rotary wing vehicles, unmanned combat aerial vehicles, tailless aircraft, hover crafts, and other airborne vehicles. Further, the present disclosure may also be contemplated for utilization in other applications that may not be coupled with an aircraft, such as, for example, industrial applications, power generation, pumping sets, naval propulsion, weapon systems, security systems, perimeter defence/security systems, and the like known to one of ordinary skilled in the art.

The gas turbine engine 100 includes a principal rotational axis 102. A radial direction R is defined with respect to the principal rotational axis 102 of the gas turbine engine 100. As used herein, the terms that refer to a radial direction, such as "radially outer", "radially inner", "radially extends", "radially inwards", "radially outwards", and "radially proximal", are with respect to the radial direction R. A circumferential direction C (shown in FIG. 3A) is defined with respect to the principal rotational axis 102. As used herein, the terms that refer to a circumferential direction, such as "circumferentially extends", "circumferentially extending", "circumferentially surrounding", "circumferentially inclined", "circumferentially with respect to", "circumferential guidance", and "circumferentially disposed between", are with respect to the circumferential direction C (shown in FIG. 3A).

The gas turbine engine 100 further includes a fan 104 coaxial with the principal rotational axis 102. A nacelle 106 circumferentially surrounds the fan 104. The gas turbine engine 100 further includes a core engine 110 disposed downstream of the fan 104 and extending along the principal rotational axis 102. In some embodiments, the core engine 110 includes, in axial flow series, a compressor (not shown), a combustion equipment (not shown), a turbine (not shown), and a core exhaust nozzle 112.

The fan 104 includes multiple blades 108 that may generate an airflow. The fan 104 provides the airflow to the core engine 110 which, in turn, generates a combustion gas (or a mixture of gases) that powers the turbine. The turbine may then drive the fan 104 to produce thrust for the gas turbine engine 100. The fan 104 may be coupled to the turbine via a shaft (not shown).

The gas turbine engine 100 further includes a core engine casing 114 circumferentially surrounding the core engine 110 around the principal rotational axis 102. The core engine casing 114 extends along the principal rotational axis 102 from a first casing end 116 to a second casing end 118 downstream of the first casing end 116. The first casing end 116 is proximal to the fan 104. The gas turbine engine 100 further includes a splitter 124 at the first casing end 116. The core engine casing 114 includes a casing outer surface 120 and a casing inner surface 121.

The gas turbine engine 100 further includes a bypass duct 122 defined between the nacelle 106 and the casing outer surface 120. In other words, the bypass duct 122 is delimited radially between the nacelle 106 and the casing outer surface 120 of the core engine casing 114. The gas turbine engine 100 further includes a core engine duct 111 at least partially defined by the casing inner surface 121.

The fan 104 is a variable-pitch fan (i.e., having variable-pitch blades). A pitch of the blade 108 is measured via an angle of pitch which corresponds to an angle defined between a chord line of the blade 108 and a reference plane extending generally through a pitch axis of the blade 108 and extending along an axial direction of the gas turbine engine 100 parallel to the principal rotational axis 102. The fan 104 may allow the pitch of the blades 108 to be varied by rotating the blades 108 about respective pitch axes to increase a performance of the gas turbine engine 100.

In some embodiments, the fan 104 is configured to selectively operate in a normal mode F1 (shown in FIG. 1) and a reverse mode F2 (shown in FIG. 2). In the normal mode F1, the fan 104 is configured to generate an airflow A1 in a first direction D1 from the first casing end 116 to the second casing end 118. In some embodiments, the splitter 124 divides the airflow A1 into a bypass airflow B1 which passes through the bypass duct 122 and a core airflow C1 which passes through the core engine 110.

In some embodiments, in the normal mode F1, the blades 108 of the fan 104 generate the airflow A1 from upstream to downstream of the gas turbine engine 100. As used herein in the application, the terms "upstream" and "downstream" are with respect to the airflow A1 along the first direction D1 during the normal mode F1 of the fan 104. The airflow A1 may also be referred to herein as a "forward flow". The bypass airflow B1 enters the bypass duct 122 through a forward inlet 126 of the bypass duct 122 and exits the bypass duct 122 through an aft outlet 128 of the bypass duct 122. The airflow A1 may generate a forward thrust propelling the aircraft forward. This mode of operation is used, for example, when the aircraft is in a take-off and/or a cruise phase.

In the reverse mode F2 (shown in FIG. 2), the fan 104 is configured to generate an airflow A2 in a second direction D2 opposite to the first direction D1. In other words, in the reverse mode F2, the blades 108 of the fan 104 generate the airflow A2 from downstream to upstream of the gas turbine engine 100. The airflow A2 may also be referred to herein as a "reverse flow". In the reverse mode F2 (shown in FIG. 2), a bypass airflow B2 enters the bypass duct 122 through the aft outlet 128 and moves towards the forward inlet 126. The airflow A2 may generate a reverse thrust (or counter-thrust), which may help the aircraft to slow down, for example, to reduce a braking distance of the aircraft during landing.

A portion of the bypass airflow B2 is used to feed the core engine 110 as a core airflow C2. Particularly, the portion of the bypass airflow B2 negotiates a turn at the splitter 124 to enter the core engine duct 111 as the core airflow C2. Thus, the core airflows C1, C2 always circulate in the core engine 110 from upstream to downstream of the gas turbine engine 100.

The gas turbine engine 100 further includes a plurality of outlet guide vanes (OGVs) 140 arranged around the principal rotational axis 102 and coupled to the core engine casing 114. Each OGV 140 from the plurality of OGVs 140 radially extends outwards from the casing outer surface 120 into the bypass duct 122 along the radial direction R. Specifically, each OGV 140 is disposed between the nacelle 106 and the casing outer surface 120. Further, each OGV 140 is positioned downstream of the fan 104.

In some embodiments, the plurality of OGVs 140 may receive the bypass airflow B1 from the fan 104 in the normal mode F1 (shown in FIG. 1). The plurality of OGVs 140 may increase an efficiency of the fan 104 by redirecting the bypass airflow B1 as well as provide other benefits, such as, for example, decreasing an amount of noise generated by the gas turbine engine 100. In the normal mode F1 (shown in FIG. 1), the bypass airflow B1 may exit the OGVs 140 at an OGV exit angle. Alternatively, in the reverse mode F2 (shown in FIG. 2), the bypass airflow B2 may exit the plurality of OGVs 140 at an OGV inlet angle 141 (shown in FIG. 5A).

The gas turbine engine 100 further includes a plurality of stator vanes 142 coupled to the core engine casing 114 proximal to the first casing end 116. Each stator vane 142 from the plurality of stator vanes 142 radially extends inwards from the casing inner surface 121 into the core engine duct 111. In some embodiments, the plurality of stator vanes 142 may be referred to as "Engine Section Stator" (ESS) vanes or "core inlet stator" vanes. In other words, the plurality of stator vanes 142 are ESS vanes.

The plurality of stator vanes 142 may receive the core airflow C1 in the normal mode F1 (shown in FIG. 1) of the fan 104 and may receive the core airflow C2 in the reverse mode F2 (shown in FIG. 2) of the fan 104. The core airflow C2 forms a portion of the bypass airflow B2 exiting the plurality of OGVs 140 and turning towards the core engine duct 111 at the first casing end 116. In some embodiments, the plurality of stator vanes 142 may guide the core airflow C1 (shown in FIG. 1) or the core airflow C2 (shown in FIG. 2) entering the core engine duct 111.

The gas turbine engine 100 further includes a plurality of flaps 130 pivotally coupled to the core engine casing 114 and arranged circumferentially around the principal rotational axis 102. Specifically, the plurality of flaps 130 are pivotally coupled to the splitter 124 at the first casing end 116. Further, each flap 130 is disposed upstream of the first casing end 116. Moreover, each flap 130 from the plurality of flaps 130 extends from the first casing end 116 (or the splitter 124) towards the fan 104.

Each flap 130 is configured to pivotally rotate relative to core engine casing 114 about a pivot axis P parallel to the principal rotational axis 102. Each flap 130 is pivotable between a first position X1 (shown in FIG. 1) and a second position X2 (shown in FIG. 2) about the pivot axis P. In some embodiments, in the normal mode F1 (shown in FIG. 1), each flap 130 is in the first position X1. In some embodiments, in the reverse mode F2 (shown in FIG. 2), each flap 130 is in the second position X2. Further, each flap 130 is in the second position X2 only during the reverse mode F2 of the fan 104.

As shown in FIG. 2, in the second position X2, each flap 130 extends at least partially into the bypass duct 122 and the core engine duct 111. Thus, each flap 130 may intercept the bypass airflow B2 in the second position X2 and may provide circumferential guidance to the bypass airflow B2 with respect to the principal rotational axis 102. This is described in greater detail later in the application.

In some embodiments, the gas turbine engine 100 further includes an actuation mechanism 146 operatively coupled to each flap 130. The actuation mechanism 146 is configured to selectively rotate each flap 130 between the first position X1 (shown in FIG. 1) and the second position X2 (shown in FIG. 2). In some embodiments, the actuation mechanism 146 may be located between the core engine duct 111 and the bypass duct 122 proximal to the first casing end 116. It should be understood that any suitable type of actuation mechanism 146 may be utilized (e.g., a pneumatic or hydraulic push-lever-arm, electric motor powered, or other actuation mechanisms) for selectively rotating each flap 130 between the first position X1 (shown in FIG. 1) and the second position X2 (shown in FIG. 2).

In some embodiments, each flap 130 may be a thin plate that may remain in the first position X1 in the normal mode F1 (shown in FIG. 1) of the fan 104. Thus, the plurality of flaps 130 may not obstruct the airflow A1 (or the forward flow) in the normal mode F1 of the fan 104 since the plurality of flaps 130 are aligned with an edge of the first casing end 116 (or the splitter 124). In some embodiments, the plurality of flaps 130 may be made of any suitable material, e.g., a metal, a polymer, a composite, a ceramic, or a combination thereof. Further, the plurality of flaps 130 may be produced using any suitable manufacturing method known to one skilled in the art.

In some embodiments, each flap 130 has an axial length 148 (shown in FIG. 1) along the principal rotational axis 102. In some embodiments, the axial length 148 of each flap 130 is from 10% to 100% of a chord length 143 (shown in FIG. 5B) of each stator vane 142. The axial length 148 of each flap 130 may depend upon a gap between the first casing end 116 and the fan 104, as well as functional and weight considerations. For example, an increase in the axial length 148 of each flap 130 may increase a power required by the actuation mechanism 146 to rotate the flap 130 between the first position X1 (shown in FIG. 1) and the second position X2 (shown in FIG. 2). Therefore, it may be preferred that the axial length 148 may be kept as small as possible as is required for the circumferential guidance of the bypass airflow B2 (shown in FIG. 2).

Figure 3B:
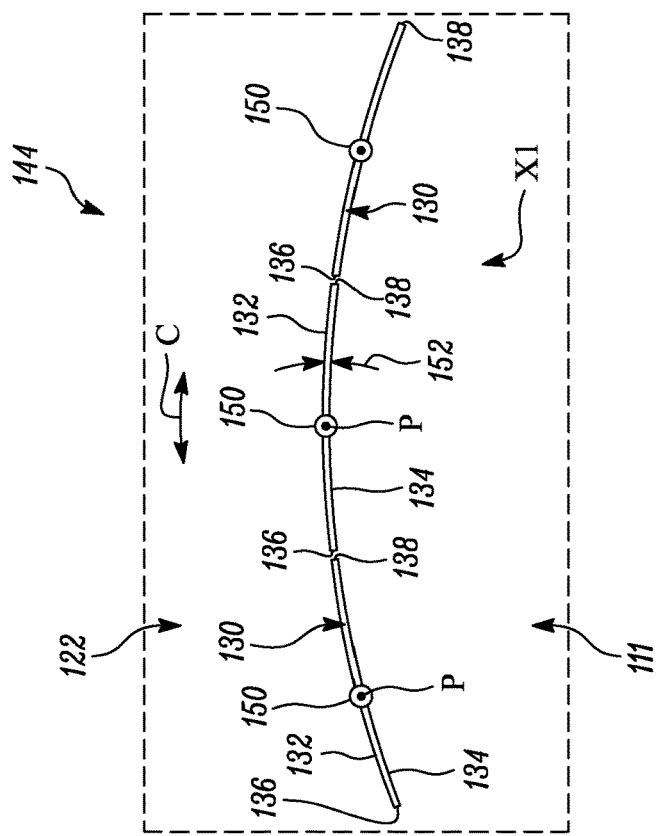
FIG. 3B is an enlarged schematic view of a section of the gas turbine engine as shown in FIG. 3A, according to an embodiment of the present disclosure.
Figure 3A:
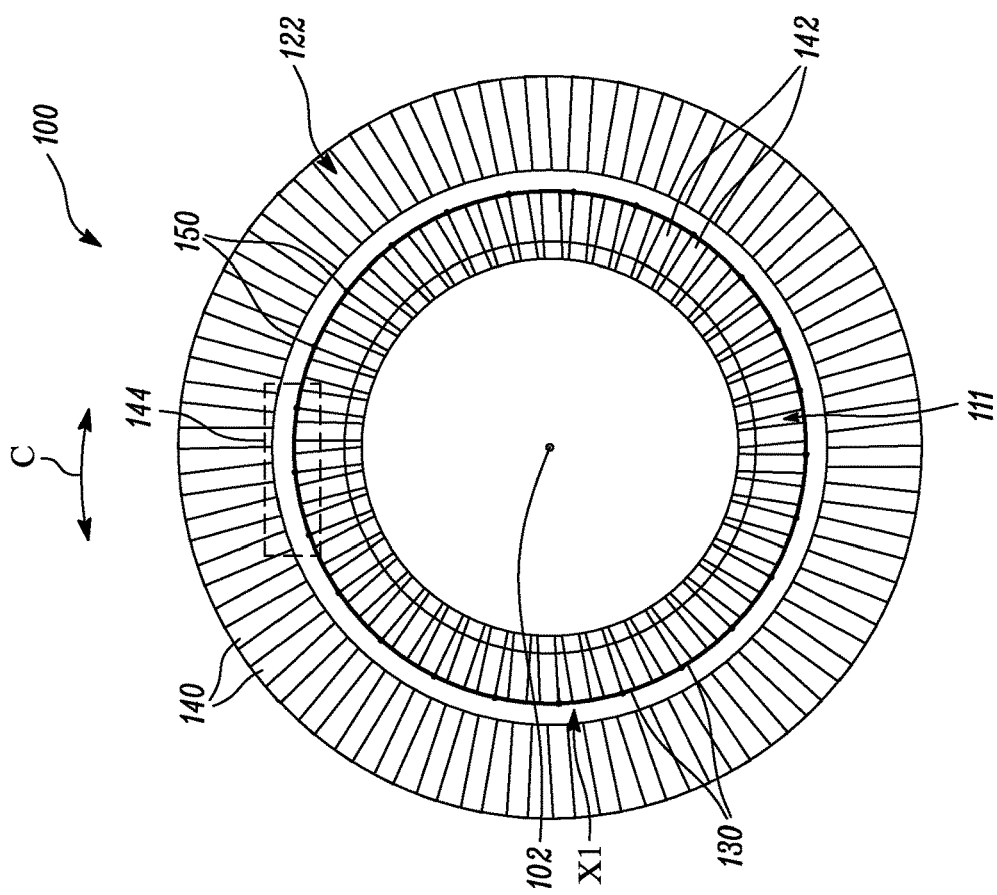
FIG. 3A is a schematic front view of the gas turbine engine in a first position of a plurality of flaps, according to an embodiment of the present disclosure.

FIG. 3A illustrates a schematic front view of the gas turbine engine 100 in the first position X1 of each flap 130. Some components (e.g., the fan 104) of the gas turbine engine 100 are not shown in FIG. 3A for clarity.

In the first position X1, each flap 130 is disposed in the circumferential direction C around the principal rotational axis 102 and is radially disposed between the plurality of OGVs 140 and the plurality of stator vanes 142 relative to the principal rotational axis 102. Further, in the first position X1, the plurality of flaps 130 form a closed ring around the principal rotational axis 102.

In some embodiments, a number of the plurality of flaps 130 is from 3 to 70. In the illustrated embodiment of FIG. 3A, the gas turbine engine 100 includes 25 flaps 130. However, it should be understood that the number of flaps 130 may vary based on application requirements. Further, the number of flaps 130 may depend on the actuation mechanism 146 (shown in FIGS. 1 and 2), a radius of the first casing end 116 or the splitter 124, and an extent of the circumferential guidance required by the bypass airflow B2 in the reverse mode F2 of the fan 104 (shown in FIG. 2).

In some embodiments, the plurality of flaps 130 may have a circumferential extent of about 360 degrees around the casing outer surface 120 (shown in FIGS. 1 and 2) of the core engine casing 114. In some embodiments, the plurality of flaps 130 are disposed equiangularly around the principal rotational axis 102. In other words, the plurality of flaps 130 may be spaced apart from each other at equal angles with respect to the principal rotational axis 102.

FIG. 3B illustrates an enlarged schematic view of a section 144 (shown in FIG. 3A) of the gas turbine engine 100 in the first position X1 of each flap 130. Some components of the gas turbine engine 100 (e.g., the plurality of stator vanes 142 and the plurality of OGVs 140) are omitted in FIG. 3B for clarity purposes. Referring now to FIGS. 1, 3A and 3B, the gas turbine engine 100 further includes a plurality of pivot rods 150 corresponding to the plurality of flaps 130. Each pivot rod 150 from the plurality of pivot rods 150 is coupled to the core engine casing 114 and extends from the first casing end 116 towards the fan 104 along the pivot axis P.

Each flap 130 is pivotally coupled to a corresponding pivot rod 150 from the plurality of pivot rods 150. Each pivot rod 150 may allow the corresponding flap 130 to rotate relative to core engine casing 114 about the pivot axis P between the first position X1 (shown in FIG. 1) and the second position X2 (shown in FIG. 2). It should be understood that any other suitable coupling mechanism may be utilized for pivotably coupling each flap 130 with the core engine casing 114.

Each flap 130 includes a first major surface 132 facing the bypass duct 122 and a second major surface 134 opposite to the first major surface 132 and facing the core engine duct 111. In some embodiments, each of the first major surface 132 and the second major surface 134 is curved, such that the plurality of flaps 130 form an annular arrangement around the principal rotational axis 102 in the respective first positions X1. In the first position X1, each flap 130 is flush with the casing outer surface 120 of the core engine casing 114.

In some embodiments, each of the first major surface 132 and the second major surface 134 may follow a shape of the casing outer surface 120. Thus, in the respective first positions X1, the plurality of flaps 130 may not obstruct the airflow A1 (or the forward flow) during the normal mode F1 of the fan 104, thereby, providing an aerodynamic continuity and avoiding disruption to the airflow A1.

In some embodiments, each flap 130 has a constant thickness 152 between the first major surface 132 and the second major surface 134. Thus, the first major surface 132 and the second major surface 134 may have a substantially similar shape (e.g., an arcuate shape). The thickness 152 of each flap 130 may need only be sufficient to ensure a structural integrity of the flap 130 to minimize a weight and a power requirement of the actuation mechanism 146 for rotating each flap 130 between the first position X1 and the second position X2 (shown in FIG. 2). However, in alternative embodiments, the plurality of flaps 130 may have a varying thickness between the first major surface 132 and the second major surface 134. In some embodiments, the geometrical parameters of each flap 130 may be optimized based on aerodynamic, mechanical, and weight considerations. In some embodiments, the plurality of flaps 130 may have a constant length along the circumferential direction C.

In some embodiments, each flap 130 further includes a first circumferential edge 136 disposed between the first major surface 132 and the second major surface 134. In some embodiments, each flap 130 further includes a second circumferential edge 138 opposite to the first circumferential edge 136 and disposed between the first major surface 132 and the second major surface 134. In some embodiments, each of the first circumferential edge 136 and the second circumferential edge 138 is at least partially aligned with the principal rotational axis 102 and the pivot axis P. In the illustrated embodiments, each of the first circumferential edge 136 and the second circumferential edge 138 is linear. However, the first circumferential edge 136 and/or the second circumferential edge 138 may assume any shape based on application requirements.

In some embodiments, in the first position X1, the first circumferential edge 136 of each flap 130 is disposed adjacent to the second circumferential edge 138 of an adjacent flap 130 from the plurality of flaps 130 and the second circumferential edge 138 of each flap 130 is disposed adjacent to the first circumferential edge 136 of an opposing adjacent flap 130 from the plurality of flaps 130. Thus, the plurality of flaps 130 are arranged side by side along the circumferential direction C.

In some embodiments, the plurality of flaps 130 may be arranged along the circumferential direction C such that there is no gap between the adjacent flaps 130. In other words, the adjacent flaps 130 may abut each other. In some embodiments, the plurality of flaps 130 may be arranged along the circumferential direction C such that the adjacent flaps 130 have a minimal gap between each other (e.g., an angular gap of less than 5 degrees). However, in some other embodiments, the plurality of flaps 130 may be substantially spaced apart from each other (e.g., by an angular gap of greater than 10 degrees) but equiangularly disposed around the principal rotational axis 102.

Figure 4B:
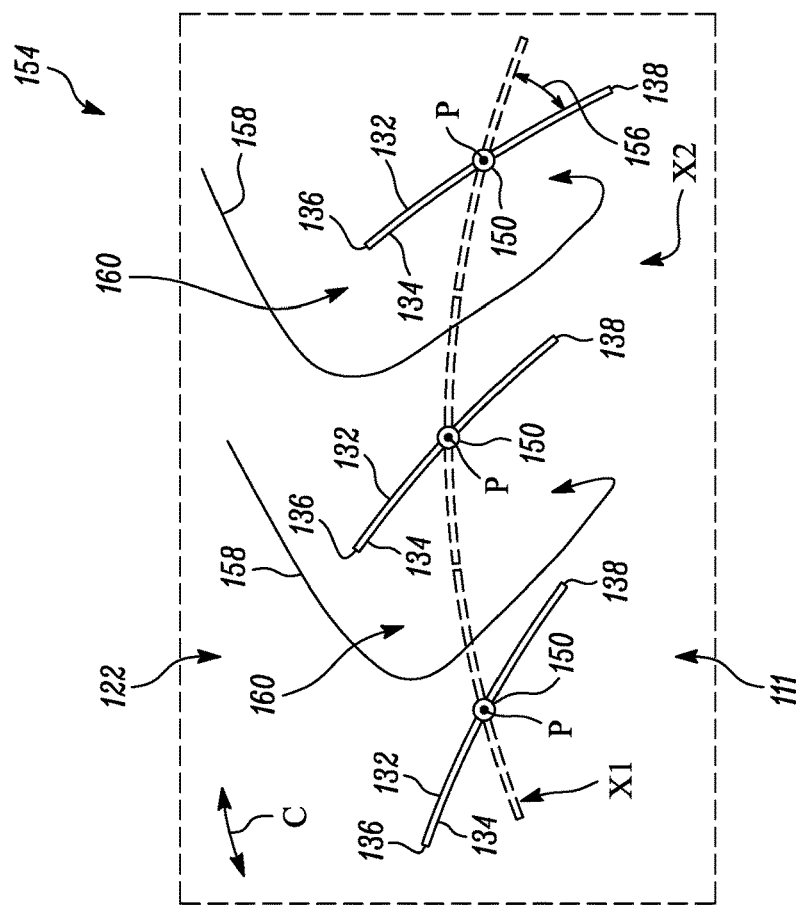
FIG. 4B is an enlarged schematic view of a section of the gas turbine engine as shown in FIG. 4A, according to an embodiment of the present disclosure.
Figure 4A:
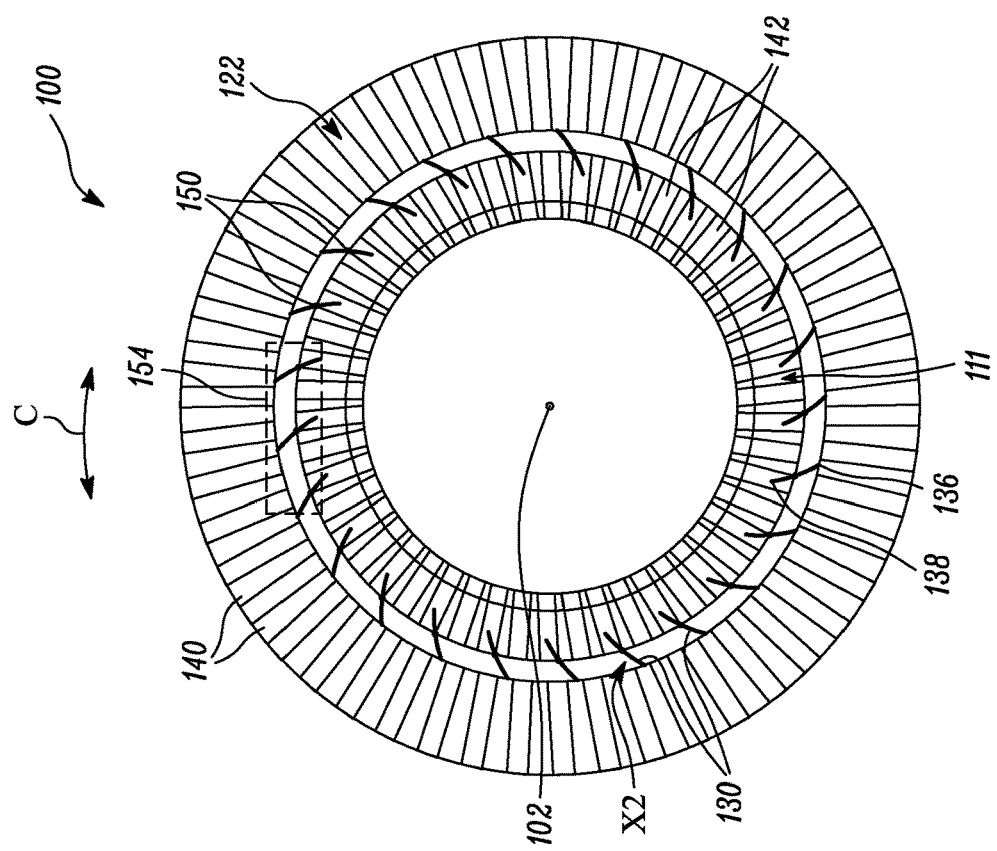
FIG. 4A is a schematic front view of the gas turbine engine in a second position of the plurality of flaps, according to an embodiment of the present disclosure.

FIG. 4A illustrates a schematic front view of the gas turbine engine 100 in the second position X2 of each flap 130. Some components (e.g., the fan 104) of the gas turbine engine 100 are not shown in FIG. 4A for clarity.

In some embodiments, a direction of rotation of each flap 130 about the pivot axis P (shown in FIG. 2) from the first position X1 (shown in FIGS. 1, 3A and 3B) to the second position X2 is the same as a direction of rotation of the fan 104 (shown in FIGS. 1 and 2) about the principal rotational axis 104. In the illustrated embodiments of FIGS. 2 and 4A, the plurality of flaps 130 are rotated clockwise relative to the core engine casing 114 about the pivot axis P (shown in FIGS. 1 and 2) based on a clockwise rotation of the fan 104 when viewing from the front of the gas turbine engine 100. However, the plurality of flaps 130 may also be configured to rotate anti-clockwise about the pivot axis P (shown in FIG. 2) based on an anti-clockwise rotation of the fan 104 about the principal rotational axis 102 when viewing from the front of the gas turbine engine 100.

As shown in FIG. 4A, in the second position X2, each flap 130 extends at least partially into the bypass duct 122 and the core engine duct 111. Further, each of the first circumferential edge 136 and the second circumferential edge 138 is radially spaced apart from the casing outer surface 120 (shown in FIGS. 1 and 2). Specifically, in the second position X2, the first circumferential edge 136 is disposed in the bypass duct 122 and the second circumferential edge 138 is disposed in the core engine duct 111.

FIG. 4B illustrates an enlarged schematic view of a section 154 (shown in FIG. 4A) of the gas turbine engine 100 in the second position X2 of each flap 130. Some components of the gas turbine engine 100 (e.g., the plurality of stator vanes 142 and the plurality of OGVs 140) are omitted in FIG. 4B for clarity purposes. Referring now to FIGS. 2, 4A and 4B, in the second position X2, each flap 130 is inclined to the first position X1. In some embodiments, an inclination angle 156 between the first position X1 and the second position X2 of each flap 130 is from 5 degrees to 85 degrees. The value of inclination angle 156 may determine the extent of the circumferential guidance of the bypass flow B2 in the reverse mode F2 of the fan 104.

In some embodiments, in the respective second positions X2, the plurality of flaps 130 form a plurality of flow channels 160 therebetween. Specifically, the plurality of flow channels 160 are formed between the second major surface 134 of one flap 130 and the first major surface 132 of an adjacent flap 130. The plurality of flow channels 160 are configured to guide the airflow A2 (or the bypass airflow B2) from the bypass duct 122 to the core engine duct 111.

In the reverse mode F2, the bypass airflow B2 moving along the second direction D2 is intercepted by an outer portion of the plurality of flaps 130 proximal to the first circumferential edge 136 as the bypass airflow B2 turns towards the core engine duct 111 at the first casing end 116. The plurality of flow channels 160 may allow a portion of the bypass airflow B2 to pass through the plurality of flaps 130 as the bypass airflow B2 turns towards the core engine duct 111 at the first casing end 116.

In some embodiments, at least a portion 166 (shown in FIG. 2) of the core engine casing 114 axially disposed between the plurality of OGVs 140 and the first casing end 116 along the principal rotational axis 102 is continuous and devoid of any passage that fluidly communicates the bypass duct 122 with the core engine duct 111. Thus, the bypass airflow B2 may enter the core engine duct 111 only after turning at the first casing end 116.

In some embodiments, in the second position X2, each flap 130 is configured to direct the airflow A2 in the bypass duct 122 (or the bypass airflow B2) circumferentially with respect to the principal rotational axis 102. Thus, each flap 130 may provide the circumferential guidance to the bypass airflow B2 as the bypass airflow B2 negotiates the turn at the first casing end 116 of the core engine casing 114 to enter the core engine duct 111 as the core airflow C2.

For example, a flow line 158 of the bypass airflow B2 is deflected circumferentially as the flow line 158 passes through the plurality of flow channels 160 towards the core engine duct 111 since the first major surface 132 and the second major surface 134 of each flap 130 is inclined with respect to the first position X1 by the inclination angle 156. Thus, the flow line 158 of the bypass airflow B2 is turned circumferentially before the flow line 158 negotiates the turn at the first casing end 116 of the core engine casing 114 to enter the core engine duct 111.

In some embodiments, an extent of the circumferential guidance provided by each flap 130 may be based on the inclination angle 156. At lower angles, the extent of the circumferential guidance may be limited while a pressure loss due to the plurality of flaps 130 may be lower. At higher angles, the extent of the circumferential guidance may be greater along with higher pressure loss due to the plurality of flaps 130. Thus, a value for the inclination angle 156 may be chosen based on consideration of the circumferential guidance required versus the pressure loss generated due to the plurality of flaps 130.

Figure 5A:
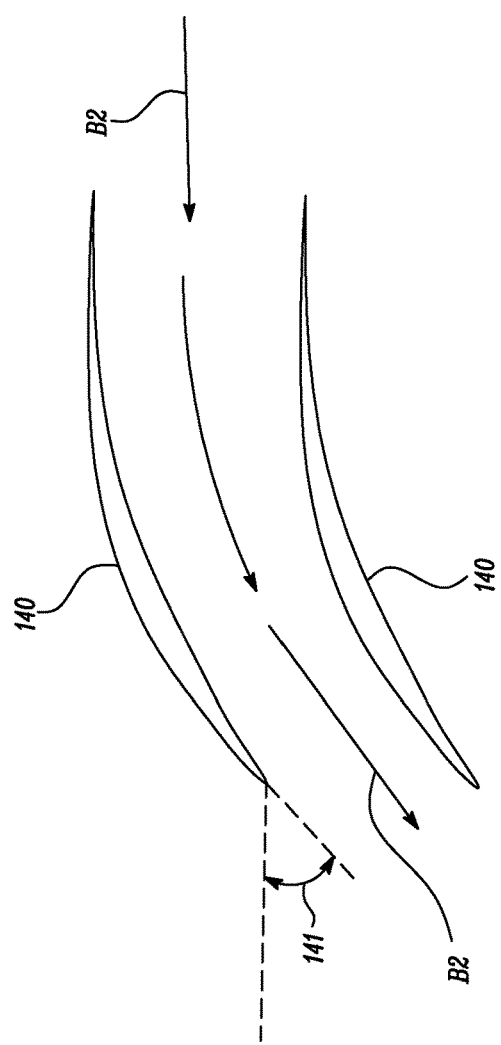
FIG. 5A is a schematic sectional view of outlet guide vanes of the gas turbine engine, according to an embodiment of the present disclosure.

FIG. 5A illustrates schematic sectional view of the plurality of OGVs 140 (as shown in FIG. 2) as viewed radially inwards towards the principal rotation axis 102. Specifically, FIG. 5A illustrates the plurality of OGVs 140 in a blade-to-blade configuration. Referring now to FIGS. 2 and 5A, the bypass airflow B2 may be deflected by the plurality of OGVs 140 before the bypass airflow B2 reaches the plurality of flaps 130. Thus, the plurality of OGVs 140 may direct the bypass airflow B2 towards the OGV inlet angle 141 as the bypass airflow B2 exits the plurality of OGVs 140. In some embodiments, the OGV inlet angle 141 may vary from 15 degrees to 45 degrees in the gas turbine engine 100 (shown in FIGS. 1 and 2).

Figure 5B:
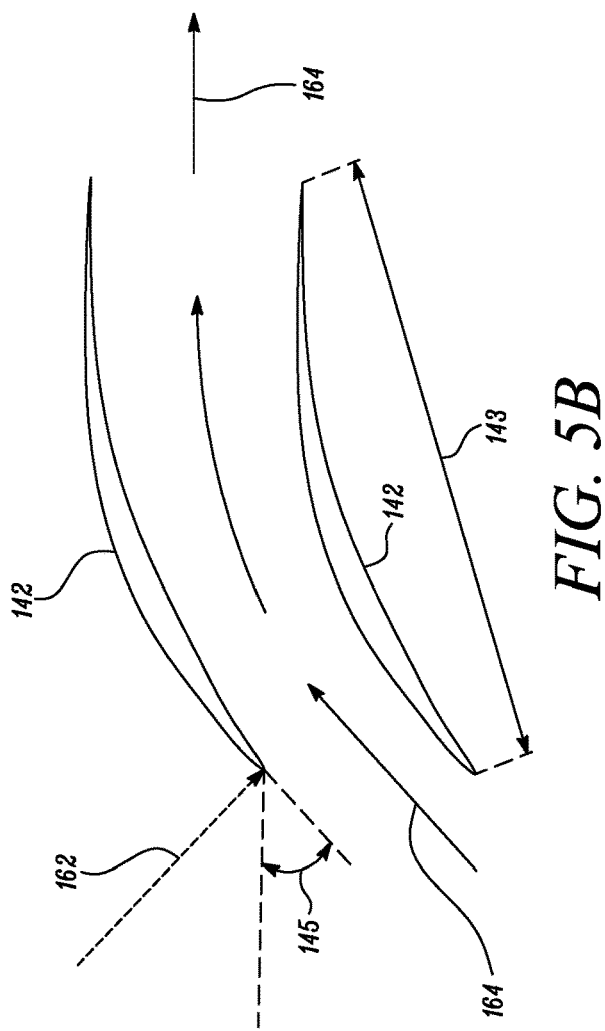
FIG. 5B is a schematic sectional view of stator vanes of the gas turbine engine, according to an embodiment of the present disclosure.

FIG. 5B illustrates schematic sectional view of the plurality of stator vanes 142 (as shown in FIG. 2) as viewed radially inwards towards the principal rotation axis 102. Specifically, FIG. 5B illustrates the plurality of stator vanes 142 in a blade-to-blade configuration.

Referring now to FIGS. 2, 4B and 5B, the plurality of flaps 130 may circumferentially guide the bypass airflow B2 through the plurality of flow channels 160 to appropriately align the core airflow C2 (resulting from the bypass airflow B2) with an inlet angle 145 of the plurality of stator vanes 142. The bypass airflow B2 is restricted from moving towards the OGV inlet angle 141 (shown in FIG. 5A) by the plurality of flow channels 160 as the bypass airflow B2 turns towards the core engine duct 111. The difference between the OGV inlet angle 141 (shown in FIG. 5A) and the inlet angle 145 of the plurality of stator vanes 142 may be from 60 degrees to 120 degrees depending upon a configuration of the gas turbine engine 100.

A flow line 162 represents airflow incident on each stator vane 142 in the reverse mode F2 of the fan 104 if the plurality of flaps 130 are absent. A flow line 164 represents airflow incident on each stator vane 142 in the reverse mode F2 of the fan 104 when each flap 130 is in the second position X2. Further, the flow lines 162, 164 represent the core airflow C2.

The plurality of flaps 130 may circumferentially guide the bypass airflow B2 to appropriately align the flow line 164 (of the core airflow C2) with the inlet angle 145 of the plurality of stator vanes 142. This may reduce adverse negative incidence of the flow line 162 on the plurality of stator vanes 142, thereby mitigating stagnation of flow along an aerofoil of the plurality of stator vanes 142 (or aerofoil separation). Thus, with the plurality of flaps 130, deterioration of the engine performance due to the mismatch between the OGV inlet angle 141 (shown in FIG. 5A) and the inlet angle 145 of the plurality of stator vanes 142 may be mitigated.

Moreover, the deployment of the plurality of flaps 130 during the aircraft landing may eliminate the aerofoil separation at the plurality of stator vanes 142. This may consequently ensure a stable operation of the core engine 110 to produce power for the fan 104 in the reverse mode F2.

It should be understood that the present disclosure is equally applicable to aero gas turbine engines.

It will be understood that the disclosure is not limited to the embodiments above described and various modifications and improvements can be made without departing from the concepts described herein within the scope of the following claims. Except where mutually exclusive, any of the features may be employed separately or in combination with any other features and the disclosure extends to and includes all combinations and sub-combinations of one or more features described herein within the scope of the following claims.

We claim:

1. A gas turbine engine having a principal rotational axis, the gas turbine engine comprising:
    a fan coaxial with the principal rotational axis;
    a nacelle circumferentially surrounding the fan;
    a core engine disposed downstream of the fan and extending along the principal rotational axis;
    a core engine casing circumferentially surrounding the core engine around the principal rotational axis, wherein the core engine casing extends along the principal rotational axis from a first casing end to a second casing end downstream of the first casing end, wherein the first casing end is proximal to the fan, and wherein the core engine casing comprises a casing outer surface and a casing inner surface;
    a bypass duct defined between the nacelle and the casing outer surface;
    a core engine duct at least partially defined by the casing inner surface;
    a plurality of outlet guide vanes arranged around the principal rotational axis and coupled to the core engine casing, wherein each outlet guide vane from the plurality of outlet guide vanes radially extends outwards from the casing outer surface into the bypass duct;
    a plurality of stator vanes coupled to the core engine casing proximal to the first casing end, wherein each stator vane from the plurality of stator vanes radially extends inwards from the casing inner surface into the core engine duct; and
    a plurality of flaps pivotally coupled to the core engine casing and arranged circumferentially around the principal rotational axis, wherein each flap from the plurality of flaps extends from the first casing end towards the fan, wherein each flap is configured to pivotally rotate relative to the core engine casing about a pivot axis parallel to the principal rotational axis, wherein each flap is pivotable between a first position and a second position about the pivot axis, wherein, in the first position, each flap is disposed in a circumferential direction around the principal rotational axis and is radially disposed between the plurality of outlet guide vanes and the plurality of stator vanes relative to the principal rotational axis, and wherein, in the second position, each flap is inclined to the first position and extends at least partially into the bypass duct and the core engine duct.

2. The gas turbine engine of claim 1, further comprising an actuation mechanism operatively coupled to each flap, wherein the actuation mechanism is configured to selectively rotate each flap between the first position and the second position.

3. The gas turbine engine of claim 1, wherein the fan is configured to selectively operate in a normal mode and a reverse mode, wherein, in the normal mode, the fan is configured to generate an airflow in a first direction from the first casing end to the second casing end, and wherein, in the reverse mode, the fan is configured to generate an airflow in a second direction opposite to the first direction.

4. The gas turbine engine of claim 3, wherein, in the normal mode, each flap is in the first position, wherein, in the reverse mode, each flap is in the second position, such that the plurality of flaps form a plurality of flow channels therebetween, and wherein the plurality of flow channels are configured to guide an airflow from the bypass duct to the core engine duct.

5. The gas turbine engine of claim 3, wherein, in the reverse mode, a direction of rotation of each flap about the pivot axis from the first position to the second position is the same as a direction of rotation of the fan about the principal rotational axis.

6. The gas turbine engine of claim 1, wherein each flap, when in the first position, comprises:
    a first major surface facing the bypass duct; and a second major surface opposite to the first major surface and facing the core engine duct; wherein each of the first major surface and the second major surface is curved, such that the plurality of flaps form an annular arrangement around the principal rotational axis.

7. The gas turbine engine of claim 6, wherein each flap has a constant thickness between the first major surface and the second major surface.

8. The gas turbine engine of claim 6, wherein each flap further comprises:
- a first circumferential edge disposed between the first major surface and the second major surface; and a second circumferential edge opposite to the first circumferential edge and disposed between the first major surface and the second major surface;
- wherein, in the first position, the first circumferential edge of each flap is disposed adjacent to the second circumferential edge of an adjacent flap from the plurality of flaps and the second circumferential edge of each flap is disposed adjacent to the first circumferential edge of an opposing adjacent flap from the plurality of flaps; and
- wherein, in the second position, the first circumferential edge is disposed in the bypass duct and the second circumferential edge is disposed in the core engine duct.

9. The gas turbine engine of claim 1, wherein each flap has an axial length along the principal rotational axis, and wherein the axial length of each flap is from 10% to 100% of a chord length of each stator vane.

10. The gas turbine engine of claim 1, wherein an inclination angle between the first position and the second position is from 5 degrees to 85 degrees.

11. The gas turbine engine of claim 1, further comprising a plurality of pivot rods corresponding to the plurality of flaps, wherein each pivot rod from the plurality of pivot rods is coupled to the core engine casing and extends from the first casing end towards the fan along the pivot axis, and wherein each flap is pivotally coupled to a corresponding pivot rod from the plurality of pivot rods.

12. The gas turbine engine of claim 1, wherein a number of the plurality of flaps is from 3 to 70.

13. The gas turbine engine of claim 1, wherein the plurality of flaps are disposed equiangularly around the principal rotational axis.

14. The gas turbine engine of claim 1, wherein at least a portion of the core engine casing axially disposed between the plurality of outlet guide vanes and the first casing end along the principal rotational axis is continuous and devoid of any passage that fluidly communicates the bypass duct with the core engine duct.

* * * * *